US009018334B2

(12) United States Patent
Montgomery et al.

(10) Patent No.: US 9,018,334 B2
(45) Date of Patent: Apr. 28, 2015

(54) POLYCARBONATE POLYOLS AND POLYURETHANES MADE THEREFROM

(75) Inventors: Steven Montgomery, Midland, MI (US); Shawn Brown, Saginaw, MI (US); Mark F. Sonnenschein, Midland, MI (US); Paul Foley, Midland, MI (US); Phillip S. Athey, Lake Jackson, TX (US); Juan Carlos Medina, Lake Jackson, TX (US); John N. Argyropoulos, Midland, MI (US); Benjamin L. Wendt, Midland, MI (US); Cecile Boyer, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 64 days.

(21) Appl. No.: 13/639,535

(22) PCT Filed: Mar. 15, 2011

(86) PCT No.: PCT/US2011/028485
§ 371 (c)(1),
(2), (4) Date: Oct. 5, 2012

(87) PCT Pub. No.: WO2011/129940
PCT Pub. Date: Oct. 20, 2011

(65) Prior Publication Data
US 2013/0023625 A1 Jan. 24, 2013

Related U.S. Application Data

(60) Provisional application No. 61/324,076, filed on Apr. 14, 2010.

(51) Int. Cl.
C08G 18/00 (2006.01)
C08G 64/02 (2006.01)
(Continued)

(52) U.S. Cl.
CPC ........ *C08G 64/0216* (2013.01); *C08G 18/0823* (2013.01); *C08G 18/12* (2013.01);
(Continued)

(58) Field of Classification Search
CPC ....................................................... C08G 18/44
USPC ......... 524/589, 590, 591, 839, 840, 871, 873, 524/874, 875; 528/81, 84, 85
See application file for complete search history.

(56) References Cited

U.S. PATENT DOCUMENTS 2,901,466 A * 8/1959 Smith et al. .................... 528/288
3,631,200 A * 12/1971 Nehring et al. ............... 558/260
(Continued)

FOREIGN PATENT DOCUMENTS

JP 2006-124486 A 5/2006
JP 2011-236443 A 11/2011
(Continued)

OTHER PUBLICATIONS

Journal of Applied Polymer Science, (2008), vol. 2, Issue 107, 1108-1115.
(Continued)

*Primary Examiner* — Michael L Leonard

(57) ABSTRACT

Embodiments of the invention provide for a polycarbonate polyol including the reaction product of at least one polyol composition and a carbonate. The polycarbonate is one of an amorphous liquid and an amorphous solid at room temperature. The polyol composition includes at least one of a mixture of 1,3-cyclohexanedimethanol and 1,4-cyclohexanedimethanol in a weight ratio from about 60:40 to about 5:95 and a polyol derived from a natural oil fatty acid or natural oil fatty acid methyl ester.

13 Claims, 5 Drawing Sheets

(51) Int. Cl.
  *C08G 18/08* (2006.01)
  *C08G 18/12* (2006.01)
  *C08G 18/44* (2006.01)
  *C08G 18/66* (2006.01)
  *C08G 18/75* (2006.01)
  *C08G 64/30* (2006.01)
  *C09D 175/06* (2006.01)

(52) U.S. Cl.
  CPC ............. *C08G 18/44* (2013.01); *C08G 18/664* (2013.01); *C08G 18/6659* (2013.01); *C08G 18/755* (2013.01); *C08G 64/305* (2013.01); *C09D 175/06* (2013.01)

(56) References Cited

U.S. PATENT DOCUMENTS

| | | | |
|---|---|---|---|
| 5,621,065 A * | 4/1997 | Pudleiner et al. | 528/84 |
| 6,789,288 B2 | 9/2004 | Wijmans et al. | |
| 7,473,756 B2 | 1/2009 | Hofacker | |
| 7,951,868 B2 | 5/2011 | Uchida et al. | |
| 8,273,849 B2 | 9/2012 | Kamps et al. | |
| 2003/0205912 A1 | 11/2003 | Dreher et al. | |
| 2006/0293400 A1* | 12/2006 | Wiltz, Jr. et al. | 521/172 |
| 2010/0261852 A1* | 10/2010 | Masubuchi et al. | 525/454 |
| 2011/0034646 A1 | 2/2011 | Fuji et al. | |

FOREIGN PATENT DOCUMENTS

WO 97/03104 A1 1/1997
WO 2010/147237 A1 12/2010

OTHER PUBLICATIONS

Heidbreder, Oleochemical products as building blocks for polymers, Fett/Lipid, 1999, vol. 11, Issue 101, 418-424.
PCT/US2011/028485, International Search Report and Written Opinion.
PCT/US2011/028485, International Preliminary Report on Patentability.

* cited by examiner

POLYCARBONATE POLYOLS AND POLYURETHANES MADE THEREFROM

CROSS-REFERENCE TO RELATED APPLICATIONS

This application claims benefit of U.S. Provisional Patent Application Ser. No. 61/324,076, filed Apr. 14, 2010, entitled "Polycarbonate Polyols and Polyurethanes Made Therefrom" which is herein incorporated by reference.

FIELD OF THE INVENTION

Embodiments of the invention relate to polycarbonate polyols and products made therefrom, more specifically to polyurethane products made using amorphous polycarbonate polyols.

BACKGROUND OF THE INVENTION

Polycarbonate polyols may be used as components in the formation of certain polyurethanes, such as polyurethanes used for elastomers or coatings. Polycarbonate polyols may be prepared by reacting at least a polyol component such as 1,4-butanediol, 1,5-pentanediol, 3-methyl-1,5-pentanediol, 1,6-hexanediol, 2-methyl-1,8-octanediol, 1,9-nonanediol, or 1,4-cyclohexanedimethanol with an organic carbonate, such as for example dimethyl carbonate. However, many polycarbonate polyols are crystalline solids at room temperature, requiring additional heat or solvents in order for the polycarbonate polyol to be used in reactions to form polyurethanes. Furthermore, polyurethanes made from polycarbonate polyols which are not crystalline solids at room temperature may have less than desirable physical properties, such as hardness, flexibility, and hydrolytic and chemical resistance. Therefore there is a need for polycarbonate polyols with better handling characteristics which at the same enable the creation of polyurethanes that have desirable physical properties.

SUMMARY OF THE INVENTION

Embodiments of the invention provide for carbonate polyols which are either amorphous solids or liquids at room temperature.

In one embodiment a polycarbonate polyol having hydroxyl terminal groups and recurring units each independently represented by the following formula (I):

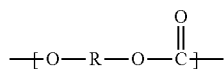
(I)

wherein R is at least one of $R_1$, $R_2$ and $R_3$ is provided. $R_1$ is at least a mixture of $R_1'$ and $R_1''$ $R_1'$ is represented by the following formula (II):

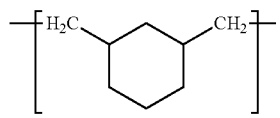
(II)

and $R_1''$ is represented by the following formula (III):

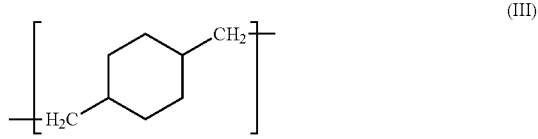
(III)

wherein the ratio of $R_1'$ to $R_1''$ is between about 60:40 and about 5:95.

$R_2$ is represented by the following formula (IV).

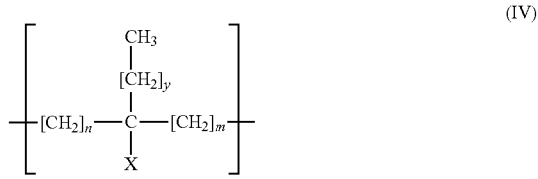
(IV)

wherein m is from 0 to 5, n and y are from 1 to 15, and X is either H or an aliphatic $C_1$ to $C_{10}$ chain.

$R_3$ is represented by the following formula (V):

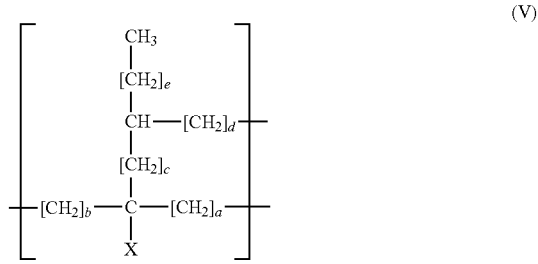
(V)

wherein a is from 0 to 5, b is from 4 to 12, c is from 1 to 6, d is from 0 to 5, e is from 3 to 7, and X is either H or an aliphatic $C_1$ to $C_{10}$ chain.

In another embodiment a polycarbonate polyol being the reaction product of at least one polyol composition and a carbonate is provided. The polycarbonate is one of an amorphous liquid and an amorphous solid at room temperature. The polyol composition includes at least one of a mixture of 1,3-cyclohexanedimethanol and 1,4-cyclohexanedimethanol in a weight ratio from about 60:40 to about 5:95 and a polyol derived from a natural oil fatty acid or natural oil fatty acid methyl ester.

Other embodiments of the invention include products made using the polycarbonate polyols described above. Such products may be the reaction product of at least one isocyanate and at least one composition which includes at least one of the olycarbonate polyols described above. Such products include elastomers. a polyurethane dispersions, coatings, synthetic leathers, adhesives, and sealants

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is contemplated that elements and features of one embodiment may be beneficially incorporated in other embodiments without fur

DESCRIPTION OF EMBODIMENTS OF THE INVENTION

Figure 1:
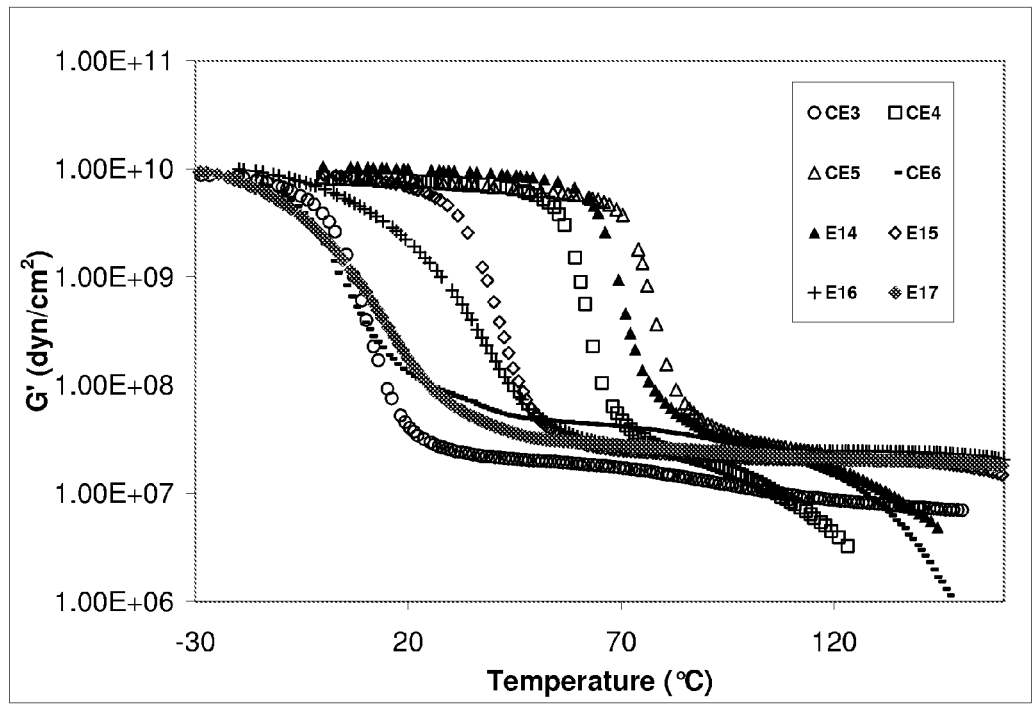
- FIG. 1 is a graph showing G' vs. temperature of elastomers made from commercial and comparative polycarbonate polyols and from polycarbonate polyols according to embodiments of the invention.

Embodiments of the invention provide for carbonate polyols which are either amorphous solids or liquids at room temperature. The absence of any significant amount of crystallinity in the carbonate polyols may result in easier handling when the carbonate polyols are used to produce polyurethanes. At the same time the resulting polyurethane products may have physical characteristics, such as hardness and solvent resistance, similar or better than those polyurethane products made from crystalline polycarbonate polyols.

According to an embodiment of the invention, the polycarbonate polyol includes recurring units each independently represented by the following formula (I):

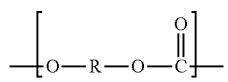
(I)

wherein R is at least one of $R_1$, $R_2$, and $R_3$.

$R_1$ is at least a mixture of $R_1'$ and $R_1''$, and $R_1'$ is represented by the following formula (II):

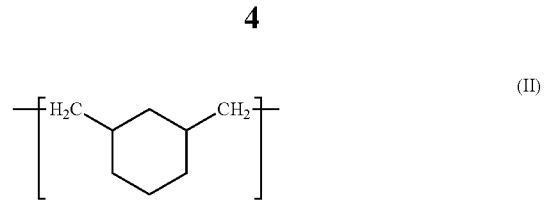
(II)

and $R_1''$ is represented by the following formula (III):

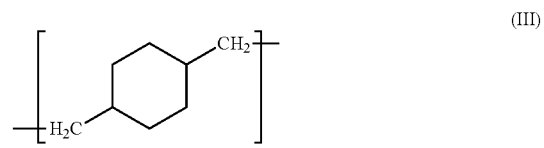
(III)

The mixture of $R_1'$ and $R_1''$ may contain between about 5 and about 90 mole percent of $R_1'$. All individual values and subranges from 5 to 90 mole percent are included herein and disclosed herein; for example, the amount of $R_1'$ in the mixture of $R_1'$ and $R_1''$ can be from a lower limit of 5, 10, 15, 20, 25, 30, 35, 40, 45, 50, 55, 60, 65, 70, 80, or 85 mole percent of $R_1$, to an upper limit of 10, 15, 20, 25, 30, 35, 40, 45, 50, 55, 60, 65, 70, 80, 85, or 90 mole percent of $R_1$.

The mixture of $R_1'$ and $R_1''$ may contain between about 25 and about 95 mole percent of $R_1''$. All individual values and subranges from 25 to 95 mole percent are included herein and disclosed herein; for example, the amount of $R_1''$ in the mixture of $R_1'$ and $R_1''$ can be from a lower limit of 25, 30, 35, 40, 45, 50, 55, 60, 65, 70, 80, 85, or 90 mole percent of $R_1$, to an upper limit of 30, 35, 40, 45, 50, 55, 60, 65, 70, 80, 85, 90, or 95 mole percent of $R_1$.

In one embodiment, the ratio of $R_1'$ to $R_1''$ is between about 60:40 and about 5:95.

In another embodiment, ratio of $R_1'$ to $R_1''$ is between about 40:60 and about 60:40.

$R_2$ is represented by the following formula (IV):

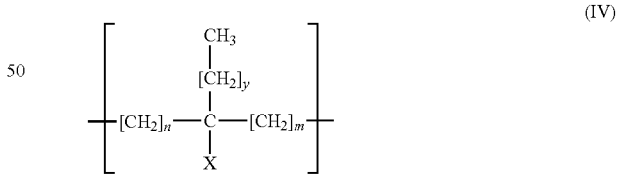
(IV)

wherein m is from 0 to 5, n is from 4 to 12, y is from 2 to 10, n+y is from 8 to 20, and X is either H or an aliphatic $C_1$ to $C_{10}$ chain. In one embodiment, m is 1, n and y are from 6 to 12, and X is H. In another embodiment, m is 1, n is 8 or 9, y is 7 or 8, and X is H. In yet another embodiment, m is 1, n is 8 or 9, y is 3 or 4, and X is H. In yet another embodiment, m is 1, n is 8 or 9, y is 5 or 6, y, and X is H. In yet another embodiment, m is 1, n is 5 or 6, y is 8 or 9, y, and X is H. Furthermore, $R_2$ may be a mixture of various embodiments possible for structure (IV).

$R_3$ is represented by the following formula (V):

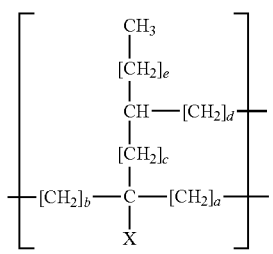

wherein a is from 0 to 5, b is from 4 to 12, c is from 1 to 6, d is from 0 to 5, e is from 3 to 7, and X is either H or an aliphatic $C_1$ to $C_{10}$ chain. In one embodiment, a and d are 1, b is 8 or 9, c is 1, 2, or 3, and e is 4 or 5, and X is H. Furthermore, $R_3$ may be a mixture of various embodiments possible for structure (V).

In addition to $R_1$, $R_2$ and/or $R_3$, R may optionally include additional aliphatic groups ($R_4$) such as $+CH_2—CH_2+$, $+CH_2—CH_2—CH_2+$, $+CH_2—C(CH_3)_2—CH_2+$, $+CH_2—(CH_2)_2—CH_2+$, $+CH_2—C(CH(CH_3)_2)—CH_2—CH_2+$, $+CH_2—(CH_2)_3—CH_2+$, $+CH_2—(CH_2)—CH(CH_3)—CH_2—CH_2+$, $+CH_2—CH(CH_3)—CH_2—CH(CH_3)—CH_2+$, $+CH_2—CH(CH_2CH_3)—CH_2—CH(CH_2CH_3)—CH_2+$, $+CH_2—(CH_2)_4—CH_2+$, $+CH_2—CH(CH_2CH_3)—(CH_2)_3—CH_2+$, $+CH_2—(CH_2)_5—CH_2+$, $+CH_2—(CH_2)_6—CH_2+$, $+CH_2—CH(CH_3)—(CH_2)_5—CH_2+$, $+CH_2—(CH_2)_7—CH_2+$, $+CH_2—(CH_2)_8—CH_2+$,

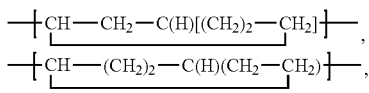

or combinations therof.

The polycarbonate polyols according to the embodiments of the invention may have number average molecular weight of at least about 300, preferably between about 500 and about 10,000, preferably between about 750 and about 5,000.

It has been found that polycarbonate polyols including the repeating units of $R_1$ and/or $R_2$ are amorphous and, when they are applied to polyurethanes or other elastomer product, a balance of polycarbonate polyol handling properties and product physical properties (such as for example hardness and flexibility) is excellent as compared with those using conventional polycarbonate polyols.

According to embodiments of the invention, the polycarbonate polyols described above may be amorphous solids or liquids, and may lack any significant amount of crystallinity. In one embodiment of the invention, the polycarbonate polyols may have a crystalline content of less than 10 j/g determined by differential scanning calorimetry in accordance with DIN 51 004 at 20° K/min from room temperature to 250° C., using a nitrogen flow of 3 L/h as carrier gas Furthermore, in an embodiment of the invention, the polycarbonate polyols have low viscosities. For example, the polycarbonate polyols may have a viscosity between about 5 and about 10000 Poise as measured at 70° C. by parallel plate rheometry. All individual values and subranges between about 5 Poise and about 10000 Poise. are included herein and disclosed herein; for example, the viscosity can be from a lower limit of 5, 10, 20, 30, 40, 60, 80, 100, 200, 300, 400, 500, 600, 700, 800, 900, 1000, 1500, 2000, 2500, 3000, 3500, 4000, 4500, 5000, 6000, or 7000 Poise, to an upper limit of 80, 100, 200, 300, 400, 500, 600, 700, 800, 900, 1000, 1500, 2000, 2500, 3000, 3500, 4000, 4500, 5000, 6000, 7000, 8000, 9000, or 10000 Poise.

According to one embodiment of the invention, the polycarbonate polyol of structure (I) may be obtained by subjecting at least one polyol mixture and at least one carbonate compound to a polymerization reaction. With respect to the method for performing the polymerization reaction, there is no particular limitation, and the polymerization reaction can be performed by using conventional methods known in the art.

The at least one polyol mixture includes at least one of a mixture of 1,3-cyclohexanedimethanol and 1,4-cyclohexanedimethanol and a natural oil derived polyol (NODP).

The mixture of 1,3 isomer and 1,4 isomer may contain between about 5 and about 90 mole percent of 1,3 isomer. All individual values and subranges from 5 to 90 mole percent are included herein and disclosed herein; for example, the amount of 1,3 isomer in the mixture of 1,3 isomer and 1,4 isomer can be from a lower limit of 5, 10, 15, 20, 25, 30, 35, 40, 45, 50, 55, 60, 65, 70, 80, or 85 mole percent of the mixture, to an upper limit of 10, 15, 20, 25, 30, 35, 40, 45, 50, 55, 60, 65, 70, 80, 85, or 90 mole percent of the mixture.

The mixture of 1,3 isomer and 1,4 isomer may contain between about 25 and about 95 mole percent of 1,4 isomer. All individual values and subranges from 25 to 95 mole percent are included herein and disclosed herein; for example, the amount of 1,4 isomer in the mixture of 1,3 isomer and 1,4 isomer can be from a lower limit of 25, 30, 35, 40, 45, 50, 55, 60, 65, 70, 80, 85, or 90 mole percent of the mixture, to an upper limit of 30, 35, 40, 45, 50, 55, 60, 65, 70, 80, 85, 90, or 95 mole percent of the mixture.

Mixtures of 1,3-cyclohexanedimethanol and 1,4-cyclohexanedimethanol are commercially available under the trade name UNOXOL diol from The Dow Chemical Company which is an approximate 1:1 mixture of (cis, trans) 1,3-cyclohexanedimethanol and (cis, trans) 1,4-cyclohexanedimethanol.

The NODP may derived from the fatty acids of natural oils and/or fats. Such oils and/or fats are generally comprised of triglycerides, that is, fatty acids linked together with glycerol. Preferred are vegetable oils that have at least about 70 percent unsaturated fatty acids in the triglyceride. Preferably the natural product contains at least about 85 percent by weight unsaturated fatty acids. Examples of preferred vegetable oils include, for example, those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof. Examples of animal products include lard, beef tallow, fish oils and mixtures thereof. Additionally, oils obtained from organisms such as algae may also be used. A combination of vegetable, algae, and animal based oils/fats may also be used.

The natural oil derived polyols may be obtained by a multi-step process wherein the animal or vegetable oils/fats are subjected to transesterification and the constituent fatty acids recovered. This step is followed by hydroformylating carbon-carbon double bonds in the constituent fatty acids followed by hydrogenation to form hydroxymethyl groups. Suitable hydroformylation/hydrogenation methods are described in U.S. Pat. Nos. 4,731,486 and 4,633,021, for example, and in U.S. Patent Application No. 2006/0193802.

The hydroxymethylated fatty acids are herein labeled "monomers". The monomers may be a single kind of hydroxymethylated fatty acid and/or hydroxymethylated fatty acid methyl ester, such as hydroxymethylated oleic acid or methylester thereof, hydroxymethylated linoleic acid or methylester thereof, hydroxymethylated linolenic acid or methylester thereof, hydroxymethylated α- and γ-linolenic acid or methyl ester thereof, hydroxymethylated myristoleic acid or methyl ester thereof, hydroxymethylated palmitoleic acid or methyl ester thereof, hydroxymethylated vaccenic acid or methyl ester thereof, hydroxymethylated petroselinic acid or methyl ester thereof, hydroxymethylated gadoleic acid or methyl ester thereof, hydroxymethylated erucic acid or methyl ester thereof, hydroxymethylated nervonic acid or methyl ester thereof, hydroxymethylated stearidonic acid or methyl ester thereof, hydroxymethylated arachidonic acid or methyl ester thereof, hydroxymethylated timnodonic acid or methyl ester thereof, hydroxymethylated clupanodonic acid or methyl ester thereof, hydroxymethylated cervonic acid or methyl ester thereof, or hydroxymethylated ricinoleic acid or methylester thereof. In one embodiment, the monomer is hydroxymethylated methyloelate. Alternatively, the monomer may be the product of hydroformylating the mixture of fatty acids recovered from transesterifaction process of the animal or vegetable oils/fats. In one embodiment the monomer is hydoformylated soy bean fatty acids. In another embodiment the monomer is castor bean fatty acids. In another embodiment, the monomer may be a mixture of selected hydroxymethylated fatty acids or methylesters thereof.

Alternatively, the constituent fatty acids may instead of hydroformylation/reduction undergo other reactions to functionalize the unsaturated fatty acid double bonds. In one embodiment, the monomer is a fatty acid or fatty acid ester which is hydroxylated using epoxidation and ring opening, as described in WO 2009/058367 and WO 2009/058368. In an other embodiment, the monomer is a fatty acid or fatty acid ester which is reacted with one or more nucleophilic functional groups and one or more active hydrogen functional groups in the presence of an addition reaction catalyst as described in U.S. Pat. No. 7,674,925.

The monomers are then converted to the NODP via a reduction of the acid or ester group to an OH group. The reduction can be performed by using conventional methods known in the art, such as standard $LiAlH_4$ reduction or catalytic hydrogenation.

In addition to the NODP and/or mixture of 1,3-cyclohexanedimethanol and 1,4-cyclohexanedimethanol, the polyol mixture may optionally include at least one of ethylene glycol, 1,3-propanediol, neopentyl glycol, 1,4-butanediol, 2-isopropyl-1,4-butanediol, 1,5-pentanediol, 3-methyl-1,5-pentanediol, 2,4-dimethyl-1,5-pentanediol, 2,4-diethyl-1,5-pentanediol, 1,6-hexanediol, 2-ethyl-1,6-hexanediol, 1,7-heptanediol, 1,8-octanediol, 2-methyl-1,8-octanediol, 1,9-nonanediol, 1,10-decanediol, 1,3-cyclohexanediol, 1,4-cyclohexanediol, and 2-bis(4-hydroxycyclohexyl)-propane.

The at least one carbonate compound may be selected from alkylene carbonates, diaryl carbonates, dialkyl carbonates, dioxolanones, hexanediol bis-chlorocarbonates, phosgene and urea. The alkylene carbonates include ethylene carbonate, trimethylene carbonate, 1,2-propylene carbonate, 5-methyl-1,3-dioxane-2-one, 1,2-butylene carbonate, 1,3-butylene carbonate, 1,2-pentylene carbonate, and the like. Moreover, dialkyl carbonates include dimethyl carbonate, diethyl carbonate, di-n-butyl carbonate, and the like and the diaryl carbonates include diphenyl carbonate.

The polymerization reaction may be aided by a catalyst. Examples of the catalyst may include metals such as lithium, sodium, potassium, rubidium, cesium, magnesium, calcium, strontium, barium, titanium, zirconium, hafnium, cobalt, zinc, aluminum, germanium, tin, lead, antimony, arsenic, and cerium and compounds thereof. As the metallic compounds, oxides, hydroxides, salts, alkoxides, organic compounds, and the like may be mentioned. Of these catalysts, it is preferred to use titanium compounds such as titanium tetrabutoxide, titanium tetra-n-propoxide, titanium tetra-isopropoxide, and titanium 2-ethyl hexanoate, tin compounds such as di-n-butyltin dilaurate, di-n-butyltin oxide, and dibutyltin diacetate, lead compounds such as lead acetate and lead stearate. The catalyst may be used in an amount of 1 to 10,000 ppm relative to the total charged weight of the raw materials. More preferably, the catalyst is used in an amount of 1 to 1,000 ppm.

As the polymerization reaction proceeds, a compound containing a hydroxyl group (hydroxyl group-containing by-product) may eliminated from the carbonate compound. Since the polymerization reaction is an equilibrium reaction, the polymerization may not sufficiently proceed when the hydroxyl group-containing by-product is accumulated in the reaction system. Therefore, it may be preferred to carry out the polymerization reaction while the hydroxyl group-containing by-product is removed from the reaction system. More specifically, the polymerization reaction may be carried out so that a vapor containing the hydroxyl group-containing by-product formed in the reaction is generated, with the vapor being condensed to form a condensed liquid, and at least a part of the condensed liquid being removed from the reaction system. A fractionating column and/or a reflux condenser may be used to condense the liquid. The production of the polycarbonate polyol may be conducted under normal pressure or under reduced pressure. In order to remove the hydroxyl group-containing by-product efficiently, a method of introducing an inert gas having no adverse effect on the polymerization reaction, such as helium, argon, nitrogen, carbon dioxide, or a lower hydrocarbon gas and removing the hydroxyl group-containing by-product along with these gases may be used.

The reaction temperature may be between about 80° C. and about 250° C. Preferably, the temperature is between about 90° C. and 200° C. Furthermore, the reaction temperature may be varied over the course of the reaction.

In one embodiment, the reaction temperate may be adjusted so as to reach reflux conditions. The Reflux condition may be held for an initial six to eight hours, whereupon the reaction temperature is lowered to below that of reflux for an extended amount of time (for example overnight). The reaction temperature may then be raised to above reflux temperature again for another six to eight hours.

During the course of the reaction aliquots of the reaction mixture may be collected and analyzed via, for example, routine proton NMR analysis, GPC, or OH titration, as is known in the art, In one embodiment, the number of end groups is compared, using proton NMR, to the number of internal methylenes to determine the average molecular weight for the carbonate polyol. More carbonate may be added to decrease the number of end groups and increase the number of internal methylene groups. It may be determined that additional carbonate compound may be needed, such as if the calculated molecular weight is less than the target molecular weight. Upon cooling the reaction mixture, more carbonate compound may be added as determined by the analysis, followed by additional heating to above reflux temperatures. Analysis of collected reaction aliquots may also determine that the reaction is completed when the analysis indicates that there are no more unreacted end-groups present in the mixture.

In one embodiment of the invention, the polycarbonate polyol described above may be further reacted with at least fatty acids, fatty acid esters, hydroxymethylated fatty acids, or hydroxymethylated fatty acid esters, such as those described above. Such reactions may be performed at room temperature and elevated temperatures, such as up to about 250° C., preferably between about 100° C. and about 200° C. The reactions may be performed in the presence of suitable transesterification catalysts such as for example dibutyltin dilaurate.

The polycarbonate polyol, according to the embodiments of the invention, may be reacted with an isocyanate to form a polyurethane product. Alternatively, a mixture of polycarbonate polyols may be used. For example, the mixture may include polycarbonate polyols which have $R_1$ repeating units and polycarbonate polyols which have $R_2$ and/or $R_3$ repeating units. The mixture may also include polycarbonate polyols which have R4 repeating units.

Additionally, it is contemplated that polycarbonate polyols having either $R_1$ repeating units or $R_2$ and/or $R_3$ repeating units (and optionally $R_4$ repeating units) may be used in a mixture which also includes at least a polycarbonate polyol having both $R_1$ and $R_2$ and/or $R_3$ repeating units (and optionally R4 repeating units). Furthermore, it is contemplated that polycarbonate polyols having $R_4$ repeating units may be used in a mixture which also includes at least a polycarbonate polyol having at least one of $R_1$ and $R_2$ and/or $R_3$ repeating units (and optionally $R_4$ repeating units).

The polycarbonate polyol mixture may also include natural oil based polyols (NOBP), such as those described in WO 2009/117630 and U.S. Patent Application Publication No. 2006/0276609 both of which are incorporated by reference herein. The amount of NOBP in the polycarbonate polyol mixture may be between about 0% and about 30% by weight of the entire polyol mixture. All individual values and subranges between about 0% and about 30% are included herein and disclosed herein. For example, the amount of NOBP in the polycarbonate polyol mixture may be can be from a lower limit of 0, 1, 5, 10, 15, 20, and 25% by weight of the polyol mixture, to an upper limit of 5, 10, 15, 20, 25, and 30% by weight of the polyol mixture.

The polycarbonate polyol mixture may also include a chain extender. For the purposes of the various embodiments of the invention, a chain extender means a material having two isocyanate-reactive groups per molecule and an equivalent weight per isocyanate-reactive group of less than 400, preferably less than 200 and especially from 31 to 125. The isocyanate reactive groups are preferably hydroxyl, primary aliphatic or aromatic amine or secondary aliphatic or aromatic amine groups. Representative chain extenders include amines, ethylene glycol, 1,4-butanediol, diethylene glycol, 1,2-propylene glycol, dipropylene glycol, tripropylene glycol, cyclohexane dimethanol, ethylene diamine, phenylene diamine, bis(3-chloro-4-aminophenyl)methane and 2,4-diamino-3,5-diethyl toluene.

The polycarbonate polyol mixture may contain one or more crosslinkers in addition to the high equivalent weight polyols described above. For purposes of the embodiments of the invention "crosslinkers" are materials having three or more isocyanate-reactive groups per molecule and an equivalent weight per isocyanate-reactive group of less than 400. Crosslinkers may contain from 3 to 8, especially from 3 to 4 hydroxyl, primary amine or secondary amine groups per molecule and have an equivalent weight of from 30 to about 200, especially from 50 to 125. Examples of suitable crosslinkers include diethanol amine, monoethanol amine, triethanol amine, mono- di- or tri(isopropanol) amine, glycerine, trimethylol propane, pentaerythritol, and the like.

Suitable isocyanates for use in preparing the polyurethane include a wide variety of organic mono- and polyisocyanates. Suitable monoisocyanates include benzyl isocyanate, toluene isocyanate, phenyl isocyanate and alkyl isocyanates in which the alkyl group contains from 1 to 12 carbon atoms. Suitable polyisocyanates include aromatic, cycloaliphatic and aliphatic isocyanates. Exemplary polyisocyanates include m-phenylene diisocyanate, tolylene-2-4-diisocyanate, tolylene-2-6-diisocyanate, isophorone diisocyanate, 1,3- and/or 1,4-bis(isocyanatomethyl)cyclohexane(including cis- or trans-isomers of either), hexamethylene-1,6-diisocyanate, tetramethylene-1,4-diisocyanate, cyclohexane-1,4-diisocyanate, hexahydrotolylene diisocyanate, methylene bis(cyclohexaneisocyanate) ($H_{12}$MDI), naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), tolylene-2,4,6-triisocyanate and 4,4'-dimethyldiphenylmethane-2,2',5,5'-tetraisocyanate. In some embodiments, the polyisocyanate is diphenylmethane-4,4'-diisocyanate, diphenylmethane-2,4'-diisocyanate, PMDI, tolylene-2,4-diisocyanate, tolylene-2,6-diisocyanate or mixtures thereof. Diphenylmethane-4,4'-diisocyanate, diphenylmethane-2,4'-diisocyanate and mixtures thereof are generically referred to as MDI, and all may be used. Tolylene-2,4-diisocyanate, tolylene-2,6-diisocyanate and mixtures thereof are generically referred to as TDI, and all may be used.

For preparing the desired polyurethane, a urethane formation technique known in the art may be utilized. For example, the polycarbonate polyol (mixture) may be reacted with the isocyanate at a temperature of from room temperature to about 200° C. to form a polyurethane prepolymer having NCO terminals. This polyurethane prepolymer, which cures by reaction with moisture in an atmosphere, can be used for a one-pack solventless adhesive, a sealant and the like. The polyurethane prepolymer can also be used, in combination with another polyol and a conventional crosslinking agent which is a low molecular weight compound having at least two active hydrogen atoms capable of reacting with an isocyanate, for a two-pack potting or casting material. Further, the polycarbonate polyol mixture, the polyisocyanate and, if desired, the chain extender may be reacted through a one-shot process, a prepolymer process or a reaction injection molding (RIM) process to prepare a cross-linked or thermoplastic polyurethane. In other embodiments the polycarbonate polyols may be reacted with the isocyanate and used in waterborne polyurethane dispersions for coating applications.

Waterborne polyurethane dispersions made with the various polycarbonate polyols embodied herein may be made as is conventionally know in the art. For example, a polycarbonate polyol based prepolymer may be dispersed in an aqueous phase as described in for example in U.S. Pat. Publ. No. 2008/0097044, which is herein incorporated by reference in its entirety.

To make the dispersion, the prepolymer is dispersed into the aqueous phase in a batch or continuous process. If the prepolymer is solid at room temperature, it may be heated to above its melting temperature in order to mix it with the prepolymer.

The prepolymer is dispersed into an aqueous phase under conditions that the prepolymer forms droplets dispersed in the aqueous phase that have an average diameter of from 2000 nm or less. Preferably, the droplets thus formed have average diameters of from 50 nm, more preferably 70 nm, to 1000 nm, more preferably 800 nm, even more preferably 500 nm and especially 250 nm. The weight of the disperse phase ("solids", after the subsequent curing reaction) may vary widely, from just above zero weight percent of the dispersion to 60% or more. The solids preferably constitute from 10%, more preferably from 20%, even more preferably from 30% to 60%, more preferably to 50% of the weight of the dispersion.

In order to produce the required droplet size, high shear mixing techniques such as homogenization or high pressure impingement mixing are useful. A suitable high shear impingement mixing device is a MICROFLUIDIZER® emulsifier, available from Microfluidics Corporation. Such a mixing device is described in U.S. Pat. No. 4,533,254. Ultrasonic mixing is also suitable. Electric dispersers and ultrasonifiers that convert electrical energy to high frequency mechanical energy can also be used. In addition, mechanical dispersing equipment, such as IKA or OMNI type mixers, may be used to disperse the prepolymer/monomer mixture in the aqueous phase. The dispersal of the prepolymer into the aqueous phase, as well as the subsequent processing steps to create the dispersed polymer particles, can be performed continuously or batch-wise.

The aqueous phase includes water. In addition, the aqueous phase may contain an external surfactant that provides stabilization for the particles. By "external", it is meant that the surfactant does not include the prepolymer or form part of the prepolymer. However, if the prepolymer contains hydrophilic groups (such as poly(oxyethylene groups), these may provide sufficient compatibility with the aqueous phase to form stable droplets. The external surfactant will contain relatively hydrophilic groups as well as relatively hydrophobic groups, and is more soluble in the aqueous phase than in the dispersed prepolymer droplets. The hydrophobic groups adsorb onto the droplets while the hydrophilic groups extend into the aqueous phase to bring about stabilization. The surfactant preferably will adsorb onto the dispersed droplets and reduce the interfacial tension between the droplets and the aqueous phase to 5 dynes/cm or below.

The dispersed prepolymer is subjected to conditions under which it cures to form a high molecular weight polymer having urethane and possibly urea or other groups (depending on the curing mechanism). Curing refers to any type of reaction in which the prepolymer reacts with itself or a curing agent to form solid polymer particles dispersed in the aqueous phase. Isocyanate on the prepolymer will react with water in the aqueous phase to form urea linkages and liberate carbon dioxide. A certain amount of these reactions will tend to occur when the prepolymer is dispersed. Conditions can be selected which promote the water/prepolymer reaction, such as, for example, heating the dispersed prepolymer to moderately elevated temperatures (i.e., from 30 to 100° C.).

When the polycarbonate polyols of the embodiments of the invention are used for waterborne polyurethane dispersions, it has been found that the resulting coatings may have increased hardness relative to coatings made using conventional polycarbonate polyols. For example the coatings may have a hardness according to the Konig pendulum hardness test ASTM D4366 of at least 130 Konig seconds. All individual values and subranges of at least 130 Konig seconds are included herein and disclosed herein; for example, the coatings may have a Konig pendulum hardness of at least 130, 135, 140, 145, 150, 155, 160, 165, 170, or 180 Konig seconds.

When used to make thermoplastic polyurethanes, it has been found that the resulting thermoplastic polyurethanes have superior hardness, flexibility, chemical resistance relative to thermoplastic polyurethanes made using conventional polycarbonate polyols.

EXAMPLES

The following examples are provided to illustrate the embodiments of the invention, but are not intended to limit the scope thereof. All parts and percentages are by weight unless otherwise indicated.

The following materials were used:

UNOXOL An approximate 1:1 mixture of (cis, trans) 1,3-cyclohexane-dimethanol and (cis, trans) 1,4-cyclohexanedimethanol, available from The Dow Chemical Company. UNOXOL is a trademark of The Dow Chemical Company.

1,4 Cyclohexanedimethanol 99% mixture of cis and trans, available from Sigma Aldrich.

1,6-Hexanediol Available from Sigma Aldrich.

NODP Natural oil derived polyol. Made from 90% methyl hydroxymethyl stearate (MHMS) monomers obtained from soy using the method disclosed in copending application "PURIFICATION OF HYDROFORMYLATED AND HYDROGENATED FATTY ALKYL ESTER COMPOSITIONS" filed Jun. 20, 2008, application number PCT/US08/67585, published as WO 2009/009271, the content of which has been incorporated herein by reference. The MHMS monomers are then converted to the Natural oil derived diol via lithium aluminum hydride (LAH) reduction, The NODP has a content of diols of 86.5%, the remainder of the NODP consists of triol, octadecanol, $C_{17}$ and $C_{18}$ diol, $C_{19}$ aldehyde-alcohol, and cyclic ether-alchols.

HFAMEM Hydroxymethylated fatty acid methyl ester monomers derived from soy oil as described in U.S. Pat. No. 7,615,658

NOBP Natural oil based polyol. A nominally 2.0-functional natural oil polyol prepared using HFAMEM (hydroxymethylated fatty acid methyl ester monomers). NOBP is made by reacting the hydroxymethylated soybean fatty acid methyl ester monomers with an approximately 50/50% weight mixture of 1,3-cyclohexane dimethanol and 1,4-cyclohexane dimethanol (commercially available from The Dow Chemical Company under the trade designation UNOXOL),using 650 ppm stannous octoate (commercially available from City Chemical Co.) as the catalyst. NOBP has an average of approximately 2.0 hydroxyl groups/molecule, an OH number of 132, and number average molecular weight of about 850.

Dimethyl Carbonate Available from Fluka

FOMREZ 44-112 A hydroxyl-terminated saturated linear polyester which is poly(butylene adipate) glycol having a hydroxyl number of 110.0-114.0 and a molecular weight of 1000, available from Chemtura Corporation.

TYZOR TOT Titanium 2-Ethyl Hexanoate Catalyst, available from DuPont.

IPDI Isophorone diisocyanate, available from Aldrich Chemical.

ISONATE M 125 An approximately 98/2 weight percent of 4,4'-/2,4'-MDI available from The Dow Chemical Company. ISONATE is a trademark of The Dow Chemical Company.

1,4-Butanediol Available from International Specialty Products.

Dibutyltin dilaurate Available from Sigma Aldrich.

1,3-Dimethylol-2-propionic acid Available from Sigma Aldrich

Hydrazine Chain extender available from Sigma Aldrich

Ethylene diamine Chain extender available from Sigma Aldrich.

Triethylamine Neutralizing agent available from Sigma Aldrich.

N-methylpyrollidone Solvent available from Fluka.

Eternacoll UH-100 A 1,4-cyclohexane dimethanol based polycarbonate diol with a number average molecular weight of approximately 1,100 g/mol. Available from UBE Industries.

Eternacoll UM-90 A 1,4-cyclohexane dimethanol and 1,6-hexanediol based polycarbonatediol with a number-average molecular weight of approximately 800 g/mol. Available from UBE Industries.

Desmophen C2200 A linear, hydroxyl-terminated, aliphatic polycarbonate polyol with a number-average molecular weight of approximately 2,000 g/mol. Available from Bayer Ravecarb 107 A 1,5-pentanediol and 1,6-hexanediol based polycarbonatediol with a number-average molecular weight of approximately 1,900 g/mol. Available from Polimeri Europa.

PROGLYDE DMM Dipropylene glycol dimethyl ether, available from The Dow Chemical Company.

Test Methods:

PUD solids were determined by following ASTM 2369.

PUD particle sizes were measured using a Beckman Colter LS 230.

PUD viscosities (in units of centipose) were measured at room temperature using a Brookfield viscometer.

Film thickness of the coating was determined by following ASTM D 1186.

Hydroxyl number of the polyol was determined by following ASTM D4274

Gloss measurements were made with BYK Labotron Gloss Unit ASTM D523

Impact resistance of the coating was determined by using a Gardner impact tester and following ASTM D 2794.

Abrasion resistance of the film was determined using a Taber abrader (CS-17 wheels, 1000 g weights, 500 cycles).

Pendulum hardness is determined according to the Konig pendulum hardness test by following ASTM D4366.

The pencil hardness of the film was measured by following ASTM D 3363.

The acid etch resistance of the coating was determined by placing drops of a 10% solution of $H_2SO_4$ on the coatings surface for 60 hours and observing the visual effect on the film (no effect=no change to coating surface, moderate etch=whitening of the coatings surface, severe etch=blistering of the coatings surface).

The water resistance of the coating was determined by placing drops of deionized water on the coatings surface for 60 hours and observing the visual effect on the film (no effect=no change to coating surface, moderate etch=whitening of the coatings surface, severe etch=blistering of the coatings surface).

Solvent resistance of the coating was reported as the number of methyl ethyl ketone (MEK) rubs that were required to cut through the coating to the substrate.

Polycarbonate Polyol Synthesis

The reaction set-up for the polycarbonate polyol synthesis starts with a 1000 ml, three-necked reaction flask with a thermocouple well. On the first neck is placed a Dean-Stark trap with a thermometer and condenser attached; a mechanical stirring rod with a Teflon blade is placed on the middle neck; and the third neck is capped with a removable glass stopper. A split, nitrogen bubbler line is fed into the top of the condenser via a needle through a rubber septum. The heating of the apparatus is facilitated by using a heating mantle with an external temperature control unit.

For Examples E1-E11 and Comparative Examples C1 and C2, the materials listed in

Table 1 are bulk-added into the flask and heated to reflux at a temperature range of 97° C. to 100° C. Dimethyl carbonate is added in two batches, the first batch is added during the initial bulk addition of materials, while the second batch is added on day three as described below. The mixture is constantly stirred at approximately 30 rpm. While at reflux, vapor can be observed traveling into the primary chamber of the trap. During this process, the thermometer reading is recorded indicating whether the distilling vapor is methanol (by-product) or dimethyl carbonate. If the temperature range is ≤70° C. then it is presumed that the distillation product is methanol. The vapor condenses in the secondary chamber of Dean-Stark trap and is periodically removed.

Day one, the reaction is heated at reflux while removing methanol. This is conducted over ~6-8 hour period. The temperature is then brought below reflux, to 85° C., and the material is heated overnight.

Day two, the temperature is again raised to reflux and the distillation and removal of the methanol is continued. Once the reaction reaches the point where the temperature must be raised above 110° C. to maintain reflux, a small sample is taken for NMR analysis. The reaction temperature is driven continually higher in order to maintain reflux and continue distillation of methanol. After heating for 6-8 hours, the reaction is cooled and shut down for the night.

Day three, the reaction is brought to 200° C. and heated for 4 hours. Material is then sampled for NMR analysis. Results of the NMR are analyzed to determine the potential amount of additional dimethyl carbonate that should be added. In the meanwhile, the flask is cooled below 100° C. so the dimethyl carbonate may be added safely. Once the second batch of dimethyl carbonate is added and the system is flushed with nitrogen, the temperature is brought to reflux (~140° C.) and held for 2 hours. Reaction is then cooled and shut down for the night.

Day four, the reaction temperature is gradually brought to 200° C. while removing any methanol that may distill off. Once up to temperature, the reaction is heated for ~6.5 hrs with nitrogen blowing through the system. This additional nitrogen purge is introduced by replacing the glass stopper on the third neck with a rubber septum through which the line is fed with a needle. The original nitrogen line which is fed through the top of the condenser is kept in place however; the nitrogen is turned off so the new feed line can flow through. At the end of the cook, the reaction is cooled and sampled again for NMR. If the NMR indicates some residual unreacted end-groups, the reaction is brought to 200° C. for an additional 1.5-2 hours. It is then again sampled for NMR. At this point, the run is considered complete.

TABLE 1

|  | CE1 | CE2 | E1 | E2 | E3 | E4 |
|---|---|---|---|---|---|---|
| UNOXOL (g) |  |  | 500.4 |  | 144.23 | 237.74 |
| 1,4 Cyclohexane-dimethanol (g) | 500.4 |  |  |  |  |  |
| 1,6-Hexanediol (g) |  | 497.2 |  |  |  |  |
| NODP (g) |  |  |  | 250.33 | 300.55 | 213.37 |
| First Batch of Dimethyl Carbonate (g) | 312.6 | 380.7 | 312.6 | 150.07 | 180.19 | 212.15 |
| Second Batch of Dimethyl Carbonate (g) | 33 | 80 | 90 | 56 | 62 | 140 |
| TYZOR TOT (g) | 0.2 | 0.25 | 0.2 | 0.08 | 0.08 | 0.12 |
| Polycarbonate Polyol molecular weight (g/mol) | 837 | 807 | 812 | 2440 | 1930 | 2280 |
| Polycarbonate Polyol hydroxyl number (meq/g) | 134 | 139 | 138 | 46 | 58 | 49 |
| Polycarbonate Polyol viscosity (cp)/ temperature (° C.) | 54516/70 42305/75 | 347/70 | 65010/65 44484/70 | 460/70 | 2690/70 | 3850/70 |
| Crystallization observations at Room Temperature | Within weeks | Within Minutes | Amorphous solid | Clear liquid | Clear liquid | Viscous clear liquid |

|  | E5 | E6 | E7 | E8 | E9 | E10 | E11 |
|---|---|---|---|---|---|---|---|
| UNOXOL (g) | 450 | 750.19 |  | 144.23 | 750.18 | 1125.24 | 750.2 |
| 1,4 Cyclohexane-dimethanol (g) |  |  |  |  |  |  |  |
| 1,6-Hexanediol (g) |  |  |  |  |  |  |  |
| NODP (g) |  |  | 450.78 | 300.55 |  |  |  |
| First Batch of Dimethyl Carbonate (g) | 281.1 | 468.04 | 135.12 | 180.185 | 468.02 | 702.00 | 468.59 |
| Second Batch of Dimethyl Carbonate (g) | 127 | 133 | 142 | 43 | 0 | 231.0 | 0 |
| TYZOR TOT (g) | 0.16 | 0.32 | 0.07 | 0.08 | 0.32 | 0.48 | 0.32 |
| Polycarbonate Polyol molecular weight (g/mol) | 1430 | 1034 | 1960 | 1022 | 500 | 1532 | 519 |
| Polycarbonate Polyol hydroxyl number (meq/g) | 78 | 109 | 56 |  | 217 | 65 | 216 |
| Polycarbonate Polyol viscosity (cp)/ temperature (° C.) | 90070/65 46810/70 | Not Measured | 440/70 | Not Measured | Not Measured | Not Measured | Not Measured |
| Crystallization observations at Room Temperature | Amorphous solid | Amorphous solid | Clear liquid | Clear liquid | Clear liquid | Clear liquid | Clear liquid |

Hybrid UNOXOL based polycarbonate-polyester polyol examples (Examples E12 and E13, Table 2) were made by reacting the UNOXOL based polycarbonate E9 with HFAMEM (hydroxymethylated fatty acid methyl ester monomers) in the presence of Dibutyltin dilaurate catalyst at a temperature of about 180° C.

TABLE 2

|  | E12 | E13 |
|---|---|---|
| UNOXOL based polycarbonate (E9) (g) | 150.041 | 300.033 |
| HFAMEM (g) | 197.124 | 197.124 g |
| Dibutyltin dilaurate (g) | 0.755 | 0.756 |
| Polycarbonate-polyester Polyol molecular weight (g/mol) | 1270 | 891 |
| Polycarbonate-polyester Polyol hydroxyl number (meq/g) | 88 | 126 |
| Crystallization observations at Room Temperature | Clear liquid | Clear liquid |

Thermoplastic Polyurethanes

Thermoplastic polyurethane (TPU) elastomer synthesis setup consists of a Haake melt mixer equipped with a 50 cm$^3$ mixing chamber, counter rotating mixing elements and electrical heating elements. The Haake mixing chamber and mixing elements are heated to 200° C. and the rotation of the mixing elements is started. 4,4'-methylene diphenyl diisocyanate, polycarbonate polyol, 1,4-butanediol and dibutyltin dilaurate are added sequentially. The kind of polycarbonate polyol and amounts of all the reactants are given in Table 3. The chamber is closed to the outside atmosphere by using a plunger and the torque is monitored by use of torque transducers and software. Upon reaching a torque plateau, the mixing is stopped and the material is removed from the reactor.

The resulting TPU elastomers are dried in an oven and compression molded into test specimens. Compression molding is carried out using a hydraulic platen press equipped with heating and cooling capabilities. Samples of TPU elastomers are ground into granules and placed in a mold with the proper geometry. The molding process is broken into three steps: 1) Preheat at 200° C. @0.26 MPa for 3 minutes, 2) Mold at 200° C. @2.6 MPa for 3 minutes and 3) Cool to 25° C. @2.6 MPa for 20 minutes. Testing is carried out on ASTM Type V tensile bars molded by this compression molding method.

Dynamic Mechanical Spectroscopy (DMS) analysis is carried out utilizing an ARES Solids Rheometer with torsion fixtures at 1 rad/s and a temperature ramp of −30-200° C. Tensile testing is carried out on an Instron Frame using air grips and Type V ASTM specimens pulled at a rate of 2.0 in/min.

TABLE 3

| | | Polycarbonate Polyol | | | MDI | | Butanediol | |
|---|---|---|---|---|---|---|---|---|
| | | MW* (g/mol) | weight (g) | moles | weight (g) | moles | weight (g) | moles |
| CE3 | Desmophen C2200 | 2000 | 36 | 0.018 | 18.9 | 0.0757 | 5.06 | 0.0563 |
| CE4 | Eternacoll UM-90 | 820 | 36 | 0.0439 | 20.7 | 0.0826 | 3.34 | 0.0371 |
| CE5 | Eternacoll UH-100 | 1082 | 36 | 0.0333 | 20 | 0.0798 | 4.05 | 0.045 |
| CE6 | Ravecarb 107 | 1850 | 36 | 0.0195 | 19 | 0.0761 | 4.97 | 0.0522 |
| E14 | Unoxol Based (E6) | 1034 | 36 | 0.0348 | 20.1 | 0.0802 | 3.95 | 0.0438 |
| E15 | Unoxol/NODP Based (E4) | 2312 | 36 | 0.0156 | 18.8 | 0.0751 | 5.23 | 0.0581 |
| E16 | Unoxol/NODP Based (E3) | 1990 | 36 | 0.0181 | 18.9 | 0.0758 | 5.06 | 0.0562 |
| E17 | NODP Based (E7) | 1960 | 36 | 0.0183 | 19 | 0.0758 | 5.04 | 0.056 |

Figure 2:
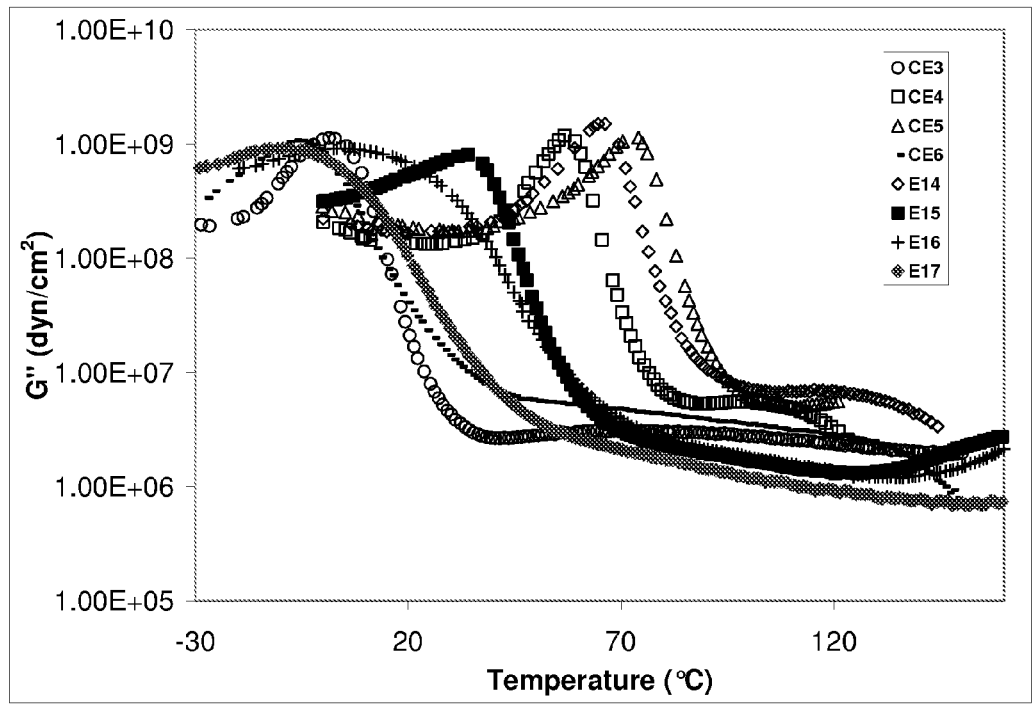
FIG. 2 is a graph showing G" vs. temperature of elastomers made from commercial and comparative polycarbonate polyols and from polycarbonate polyols according to embodiments of the invention.
Figure 3:
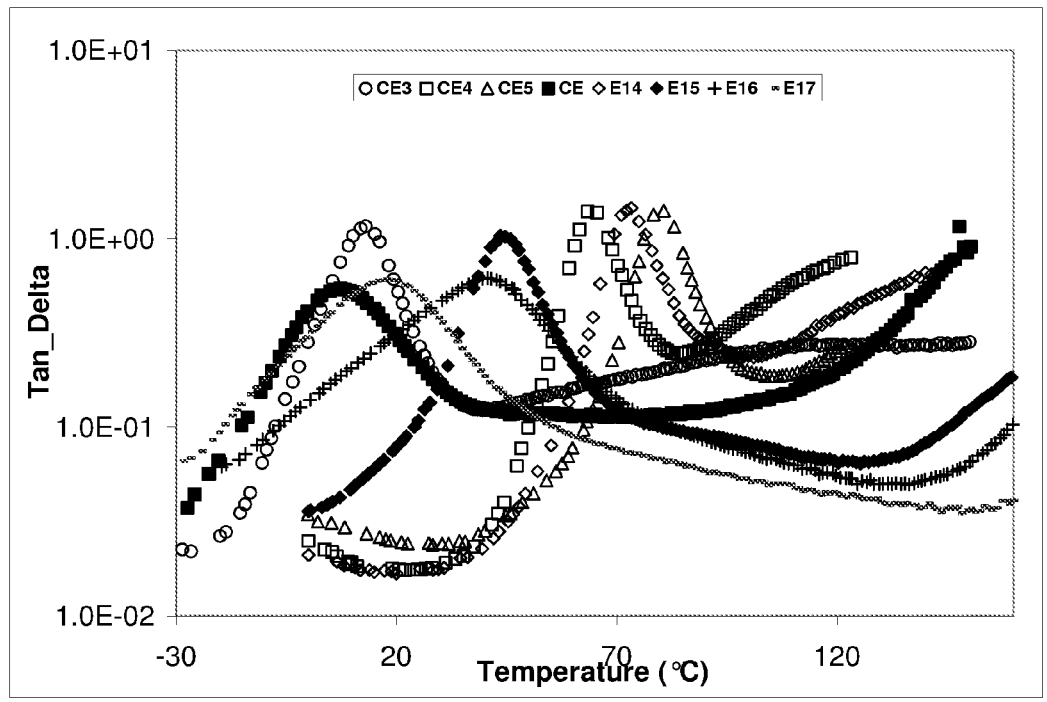
FIG. 3 is a graph showing tan δ' vs. temperature of elastomers made from commercial and comparative polycarbonate polyols and from polycarbonate polyols according to embodiments of the invention.

Transition temperatures of synthesized TPU elastomers are analyzed by use of Dynamic Mechanical Spectroscopy. Commercially available materials have also been characterized. Of the TPU elastomers synthesized from commercial polycarbonate polyols, Caffaro's Ravecarb 107 (CE6) and Bayer's Desmophen C2200 (CE3) made primarily from short linear aliphatic polyols including 1,6-hexanediol and 1,5-pentanediol have the lowest transition temperatures while Ube's Eternacoll UH-100 (CE5) and UM-90 (CE4) made primarily from 1,4-cyclohexanedimethanol as the polyol have the highest transition temperatures as illustrated in FIGS. 1-3 by the G', G" and tan δ plots. The Dow Chemical polycarbonate polyol system utilizing Natural Oil Derived Polyol and UNOXOL polyol illustrates tunability of transition temperature across the entire range of the commercial controls. The 100% natural oil derived polyol polycarbonate polyol (E17) compares closely with Ravecarb 107 (CE6) and Bayer's Desmophen C2200 (CE3) while the 100% UNOXOL polyol polycarbonate polyol (E14) compares closely with Ube's Eternacoll UH-100 (CE7) and UM-90 (CE6). It is also possible to create systems with intermediate transition temperatures by mixing natural oil derived polyol with UNOXOL polyol as in Examples E15 and E16.

Figure 4:
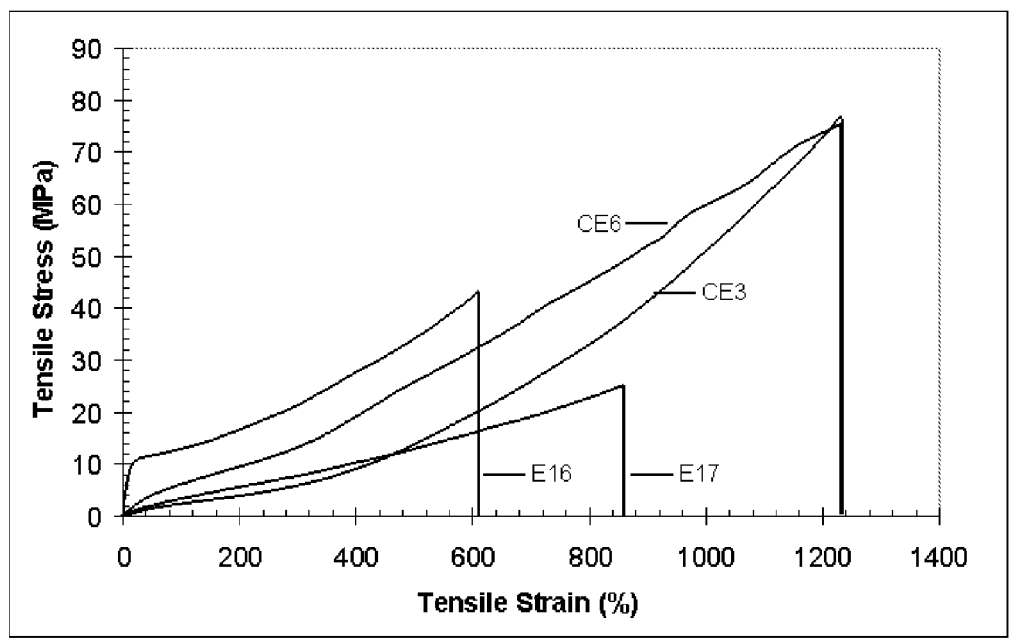
FIG. 4 is a graph showing tensile stress vs. tensile strain of elastomeric elastomers made from commercial and comparative polycarbonate polyols and from polycarbonate polyols according to embodiments of the invention.
Figure 5:
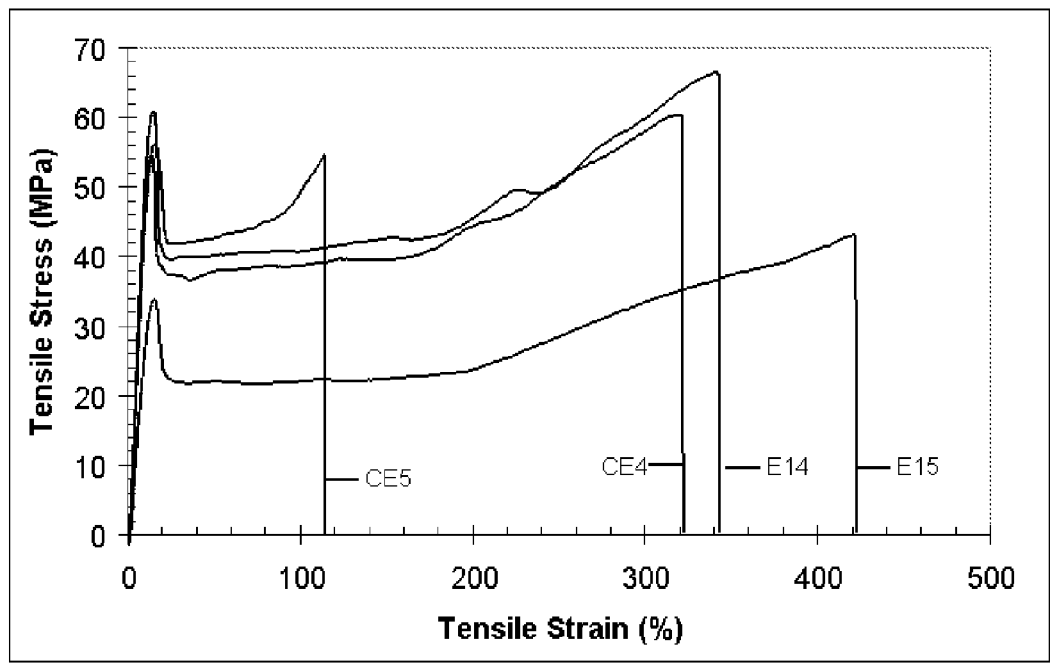
FIG. 5 is a graph showing tensile stress vs. tensile strain of plastic elastomers made from commercial and comparative polycarbonate polyols and from polycarbonate polyols according to embodiments of the invention.
Figure 6:
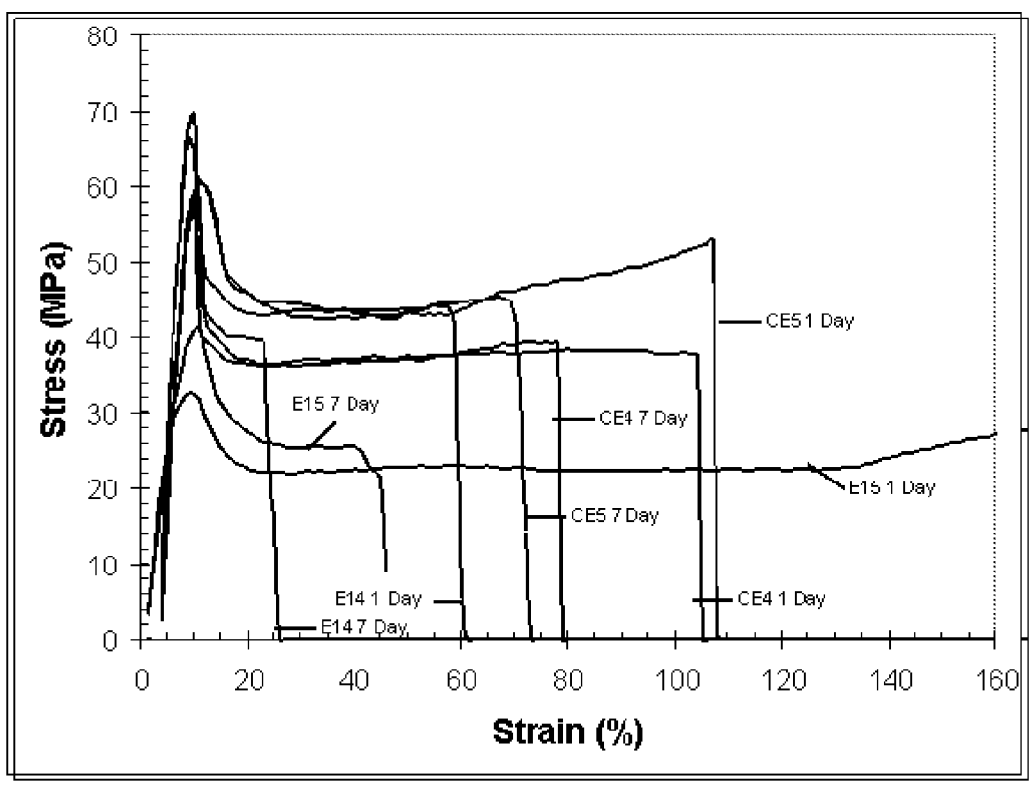
FIG. 6 is a graph showing tensile stress vs. tensile strain of polycarbonate derived polyurethanes according to embodiments of the invention after exposure to 30% $H_2SO_4$.
Figure 7:
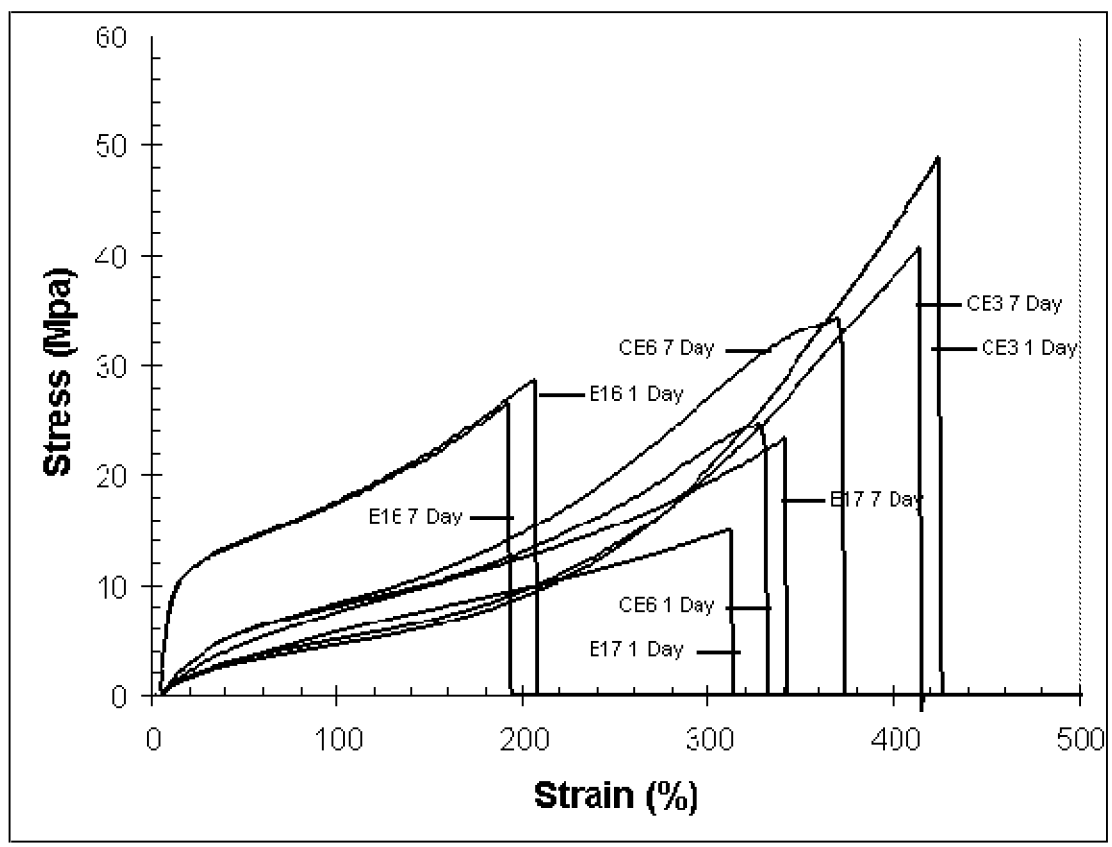
FIG. 7 is a graph showing tensile stress vs. tensile strain of polycarbonate derived polyurethanes according to embodiments of the invention after exposure to 30% $H_2SO_4$.
Figure 8:
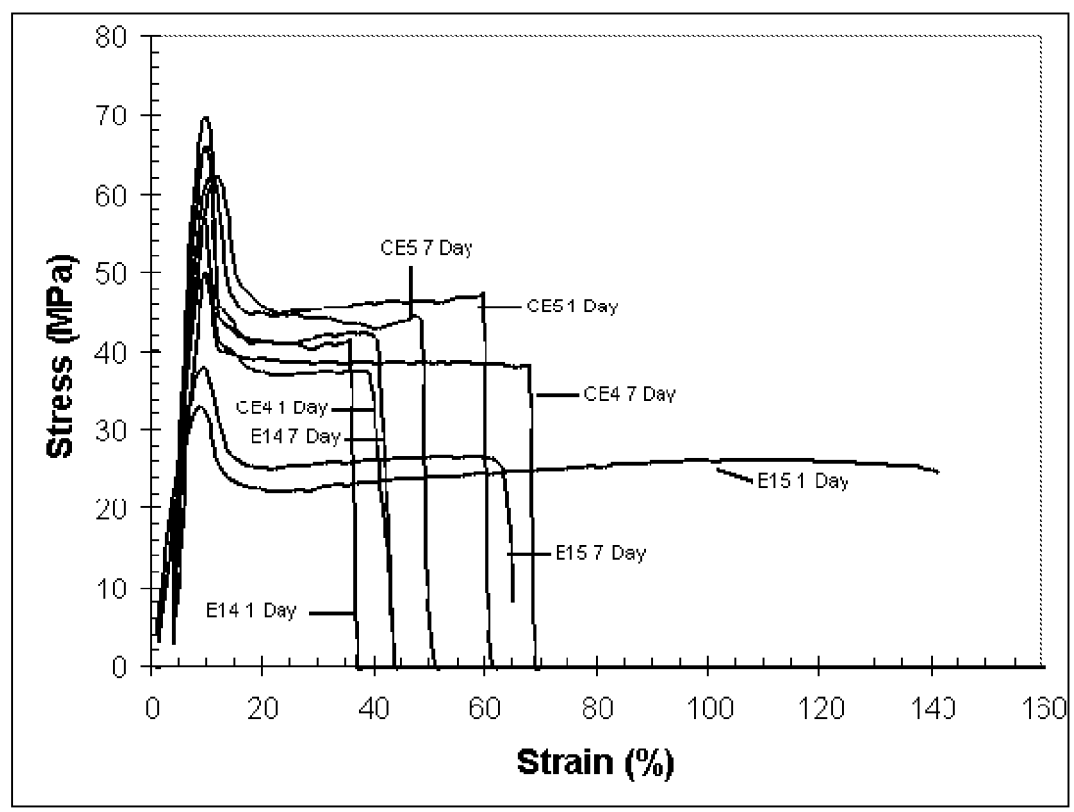
FIG. 8 is a graph showing tensile stress vs. tensile strain of polycarbonate derived polyurethanes according to embodiments of the invention after exposure to 70° C. water.
Figure 9:
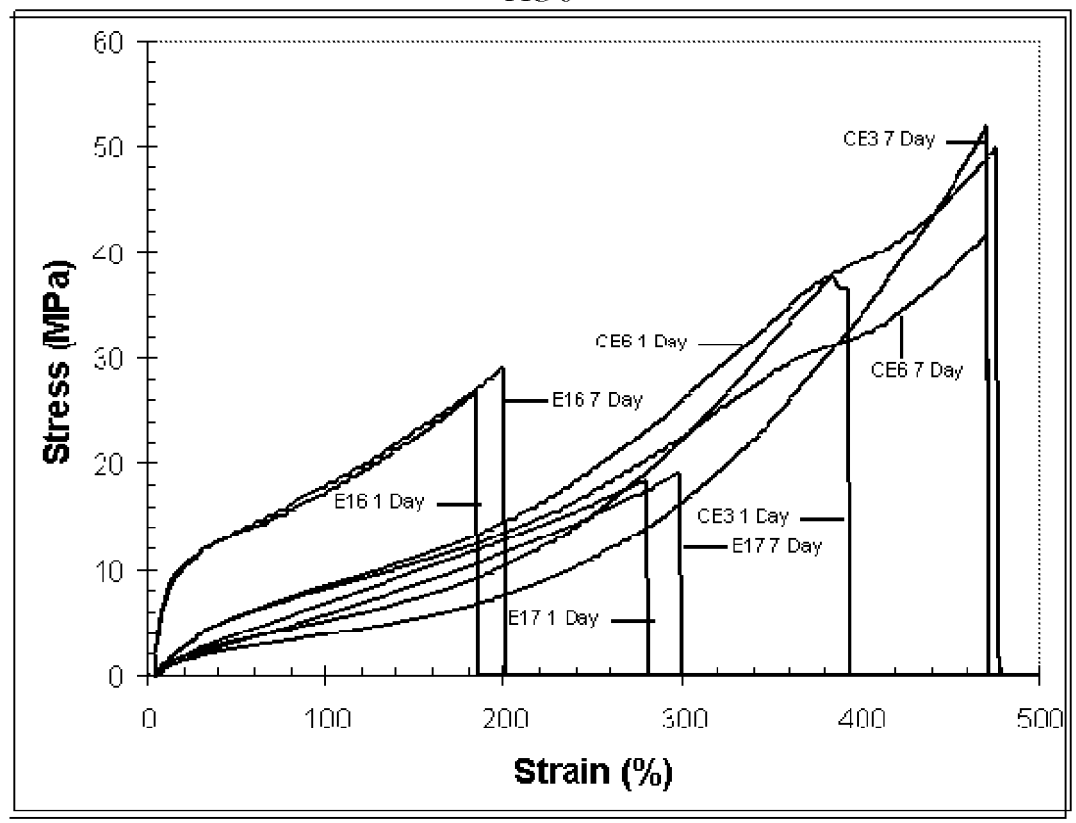
FIG. 9 is a graph showing tensile stress vs. tensile strain of polycarbonate derived polyurethanes according to embodiments of the invention after exposure to 70° C. water.

The tunable transition temperature of the Dow Chemical polycarbonate polyol system utilizing Natural Oil Derived polyol and UNOXOL polyol enables one to make a series of elastomers with varied tensile properties. TPU elastomers E16, E17, CE3, and CE6, have transition temperatures at or below room temperature and as a result display elastomeric tensile properties with tensile elongation to break in the range of 500-1500% as seen in FIG. 4. TPU elastomers E14, E15, CE4, and CE5 and have transition temperatures above room temperature and as a result display plastic tensile properties with a yield point and tensile elongation to break in the range of 100-400% as seen in FIG. 5.

Solvent resistance studies were performed under guidelines of ASTM Method D543. The solvents employed were cyclohexanone, 30% aq. $H_2SO_4$ at ambient temperature, and water at 70° C. The "dog bones" shaped polyurethane elastomer samples were immersed in the appropriate solvents and removed for analysis after 1 day and 7 days.

With regard to the use of cyclohexanone, all of the tensile bars dissolved within the first 24 of exposure, with the exception of the materials prepared from 100% NODP (E17) in which the tensile bars swelled to 4-5x their size. The resulting swelled NOP materials were susceptible to tearing and accordingly, were not suitable for further testing.

The 30% $H_2SO_4$ and 70° C. water exposure of the various polycarbonate polyol derived polyurethanes showed the same trend regardless of the nature of the solvent (FIGS. 6-9): Unoxol based polycarbonate polyols, behaved more like thermoplastics with the length of exposure time not greatly altering the properties of the polyurethane, whereas, as more NODP was incorporated into the polyurethane matrix, the material became more elastomeric in nature.

In terms of how the NODP formulation performance compared to the commercial polycarbonate polyol samples the length of the diol spacing along the backbone of the NODP diol, allowed for it compare favorably with Desmophen and Ravecarb. In both 30% $H_2SO_4$ and 70 C $H_2O$, the commercial samples had approximately 150-200% more elongation, even after solvent exposure.

Waterborne Polyurethane Dispersions

Waterborne polyurethane dispersions (PUDs) are prepared from various polyols and their coating properties are compared (see Table 4). The polyols, 1,3-Dimethylol-2-propionic acid, catalyst and N-methylpyrollidone were placed into a three neck round bottom flask equipped with a condenser, overhead stirrer, addition funnel and a nitrogen bubbler system. Under a nitrogen purge, the mixture was heated to 80° C. and stirred at ~200 rpms for 2 hours to remove any water from the starting materials. The contents were cooled to 70° C. and the stirring rate was increased to 250 rpm. The IPDI diisocyanate was placed in the addition funnel and added dropwise. The exothermic reaction was controlled using an ice bath and the reaction temperature was kept at 80° C. After the addition of the IPDI was complete, the temperature of the reaction was kept at 80° C. for 4 hours. The flask was cooled to 68° C. and triethylamine was added. The stir rate was increased to 300 rpms and held for at least 30 minutes. The prepolymer reaction contents were transferred into a large plastic container. Using a high speed mixer and a Cowles blade, water was added and the contents were stirred at 2000 rpms. To the dispersion ethylene diamine chain extender was added slowly by pipette. The contents were stirred at 2000 rmp for about 1-2 minutes. The dispersion was allowed to sit overnight and filtered through a 70 μm paint filter.

TABLE 4

| | CE7 | CE8 | E18 | E19 | E20 | E21 | E22 | E23 | E24 | E25 | E26 |
|---|---|---|---|---|---|---|---|---|---|---|---|
| FOMREZ 44-112 | | 92.89 | | | | | | | | | |
| 1,6-Hexanediol Carbonate (CE2) (g) | 85.29 | | | | | | | | | | |

TABLE 4-continued

| | CE7 | CE8 | E18 | E19 | E20 | E21 | E22 | E23 | E24 | E25 | E26 |
|---|---|---|---|---|---|---|---|---|---|---|---|
| UNOXOL polyol Carbonate (E1) (g) | | | 71.7 | | | | | | | | |
| UNOXOL polyol Carbonate (E10) (g) | | | | | | | | | | 5.6290 | |
| UNOXOL polyol Carbonate (E11) (g) | | | | | | | | | | | 5.098 |
| Unoxol/NODP based polycarbonate (E3) (g) | | | | | | | 5.6280 | | | | |
| Unoxol/NODP based polycarbonate (E4) (g) | | | | | | 5.6310 | | | | 2.8340 | |
| NODP based polycarbonate (E2) (g) | | | | | | | | | | | |
| NODP based polycarbonate (E7) (g) | | | | | | | | 5.6310 | | | |
| Hybrid UNOXOL based polycarbonate/polyester polyol (E10) (g) | | | | 5.6300 | | | | | | | |
| Hybrid UNOXOL based polycarbonate/polyester polyol (E11) (g) | | | | | 5.631 | | | | | | |
| NOBP (g) | | | | | | | | | | 2.8190 | |
| IPDI (g) | 75.42 | 82.4 | 58.04 | 4.5090 | 4.638 | 4.2990 | 4.3370 | 4.3380 | 4.4080 | 4.4820 | 5.481 |
| Dibutyl tin dilaurate (g) | 0.095 | 0.106 | 0.08 | | | | | | | | |
| 1,3-Dimethylol-2-propionic acid (g) | 12.68 | 13.85 | 9.83 | 0.6790 | 0.679 | 0.6780 | 0.6770 | 0.6750 | 0.6770 | 0.6790 | 0.68 |
| Hydrazine chain extender (g) | | | | 0.3520 | 0.353 | 0.3550 | 0.3550 | 0.3550 | 0.3530 | 0.3550 | 0.352 |
| Ethylene diamine chain extender | 7.61 | 7.6 | 5.85 | | | | | | | | |
| Triethylamine (g) | 8.145 | 8.88 | 6.25 | 0.5100 | 0.509 | 0.5100 | 0.5130 | 0.5100 | 0.5140 | 0.5110 | 0.509 |
| N-methylpyrollidone (g) | 67.62 | 55.94 | 105.05 | | | | | | | | |
| water | 263 | 308.45 | 202 | 15 | 15 | 15 | 15 | 15 | 15 | 15 | 15.00 |
| UNOXOL | | | | 0.4450 | 0.318 | 0.6590 | 0.621g | 0.6190 | 0.5450 | 0.4760 | |
| Proglyde DMM solvent | | | | 3.762 | 3.76 | 3.784 | 3.776 | 3.774 | 3.784 | 3.7770 | 3.758 |
| Film Thickness (mil) | 2.12 | 1.54 | 1.83 | 3.2 | 2.24 | n.a | 1.68 | 1.94 | 2.79 | 2.19 | n.a |
| Particle Size (μm) | 5.38 | 0.118 | 0.107 | 0.09 | 0.1 | n.a | n.m | 0.091 | 0.1 | 0.091 | n.a |
| Pendulum Hardness (Konig, sec) | 116 | 127 | 184 | 113 | 134.3 | n.a | 135 | 112 | 70 | 133 | n.a |
| Pencil Hardness (gouge/scratch) | 5H/2B | >6H/B | >6H/HB | F/n.m | F/n.m | n.a | F/n.m | F/n.m | B/n.m | F/n.m | n.a |
| Impact Resistance (direct/reverse) (in.-lb.) | 200/200 | 200/<10 | 190/195 | 40/n.m | 20/n.m | n.a | 160/an | 160/an | 20/n.m | 160/n.m | n.a |

TABLE 4-continued

| | CE7 | CE8 | E18 | E19 | E20 | E21 | E22 | E23 | E24 | E25 | E26 |
|---|---|---|---|---|---|---|---|---|---|---|---|
| mg weight loss after 500 cycles | 1.2 | 3.2 | 0.7 | n.m | n.m | n.a | n.m | n.m | n.m | n.m | n.a |
| mg weight loss after 1000 cycles | 1.8 | 6.4 | 1.3 | 10.6 | 10.6 | n.a | 15.4 | 14.8 | 5.4 | 15.2 | n.a |
| Gloss (20°/60°) | 85.3/95.6 | 84.9/94.4 | 85.3/95.3 | 105.6/107.4 | 104.9/108.7 | n.a | 95.7/106.5 | 99.8/107.2 | 104.6/108.4 | 99.6/108.0 | n.a |
| Acid Resistance (10% H2SO4, 5 h) | Slight Etch | Slight Etch | Slight Etch | No Effect | No Effect | n.a | No Effect | No Effect | Etched | No Effect | n.a |
| Water Resistance (24 h) | No effect | No Effect | Slight blush | Slight Etch | Slight Etch | n.a | Slight Etch | Slight Etch | degraded | Slight Etch | n.a | n.m = not measured, n.a = not applicable

Coatings based on UNOXOL carbonate polyol and NODP in many instances have superior hardness and abrasion resistance relative to 1,6-hexanediol carbonate polyol and NPG adipate polyol based coatings and superior flexibility (impact resistance) relative to NPG adipate polyol based coating. All the coatings have good hydrolytic and acid resistances. In Examples E21 and E26 dispersion was not obtained due to the viscosity of the prepolymer, however a diluting solvent may be used to lower the viscosity.

While the foregoing is directed to embodiments of the present invention, other and further embodiments of the invention may be devised without departing from the basic scope thereof, and the scope thereof is determined by the claims that follow.

The invention claimed is:

1. A polyurethane product comprising the reaction product of at least one isocyanate and at least one isocyanate reactive mixture including at least one polycarbonate polyol that is the reaction product of a dialkyl carbonate and a polyol mixture, wherein the polycarbonate polyol comprises hydroxyl terminal groups and recurring units each independently represented by the following formula (I):

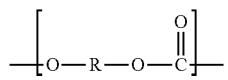

(I)

wherein R is $R_1$ and $R_1$ is at least a mixture of $R_1'$ and $R_1''$, $R_1'$ is represented by the following formula (II):

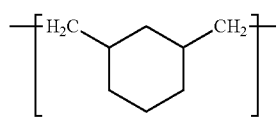

(II)

and $R_1''$ is represented by the following formula (III):

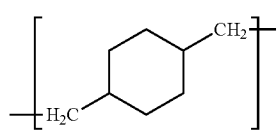

(III)

wherein the ratio of $R_1'$ to $R_1''$ is between about 60:40 and about 5:95.

2. The polyurethane product of claim 1, wherein the at least one isocyanate reactive mixture further includes at least one polycarbonate polyol comprising hydroxyl terminal groups and recurring units each independently represented by the following formula (I):

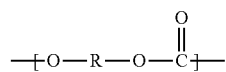

wherein R is $R_2$ is represented by the following formula (IV):

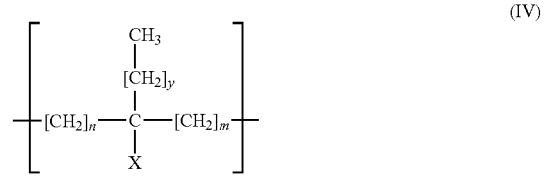

(IV)

wherein m is from 0 to 5, n and y are from 1 to 15, and X is either H or an aliphatic $C_1$ to $C_{10}$ chain.

3. The polyurethane product of claim 1, wherein the polycarbonate polyol is one of an amorphous liquid and an amorphous solid at room temperature.

4. A polyurethane product comprising the reaction product of at least one isocyanate and at least one isocyanate reactive mixture including at least one of polycarbonate polyol comprising the reaction product of at least one polyol composition and a carbonate, wherein the at least one polycarbonate polyol is one of an amorphous liquid and an amorphous solid at room temperature and the polyol composition comprises at least one of a mixture of 1,3-cyclohexanedimethanol and 1,4-cyclohexanedimethanol in a weight ratio from about 60:40 to about 5:95 and a polyol derived from a natural oil fatty acid or natural oil fatty acid methyl ester, wherein the polyurethane product comprises units derived from 1,3-cyclohexanedimethanol and 1,4-cyclohexanedimethanol.

5. The polyurethane product of claim 1, wherein the polycarbonate polyol has a viscosity below 5 Poise as measured at 70° C. by parallel plate rheometry.

6. The polyurethane product of claim 2, wherein at least part of $R_2$ is derived from methyl hydroxymethyl stearate.

7. The polyurethane product of claim 1, wherein R further comprises $R_4$, wherein $R_4$ is at least one of $-[CH_2-CH_2]-$, $-[CH_2-CH_2-CH_2]-$, $-[CH_2-C(CH_3)_2-CH_2]-$, $+CH_2-(CH_2)_2-CH_2+$, $+CH2-C(CH(CH_3)_2)-CH_2-CH_2+$, $+CH_2-(CH_2)_3-CH_2+$, $+CH_2-(CH_2)-CH(CH_3)-CH_2-CH_2+$, $+CH_2-CH(CH_3)-CH_2-CH(CH_3)-CH_2+$, $+CH_2-CH(CH_2CH_3)-CH_2-CH(CH_2CH_3)-CH_2+$, $+CH_2-(CH_2)_4-CH_2+$, $+CH_2-CH(CH_2CH_3)-(CH_2)_3-CH_2+$, $+CH_2-(CH_2)_5-CH_2+$, $+CH_2-(CH_2)_6-CH_2+$, $+CH_2-CH(CH_3)-(CH_2)_5-CH_2+$, $+CH_2-(CH_2)_7-CH_2+$, $+CH_2-(CH_2)_8-CH_2+$,

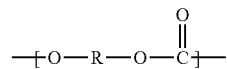, and

8. The polyurethane product of claim 1, wherein the polyurethane product is at least one of an elastomer, a polyurethane dispersion, a coating, a synthetic leather, an adhesive, and a sealant.

9. The polyurethane product of claim 4, wherein the polycarbonate polyol has a viscosity below 5 Poise as measured at 70° C. by parallel plate rheometry.

10. The polyurethane product of claim 4, wherein at least part of the polyol derived from a natural oil fatty acid or natural oil fatty acid methyl ester is derived from methyl hydroxymethyl stearate.

11. The polyurethane product of claim 4, wherein the polyurethane product is at least one of an elastomer, a polyurethane dispersion, a coating, a synthetic leather, an adhesive, and a sealant.

12. The polycarbonate polyol of claim 2, wherein m is 1, n and y are from 6 to 12, X is H, a and d are 1, b is 8 or 9, c is 1, 2, or 3, and e is 4 or 5.

13. The polyurethane product of claim 1, wherein the at least one isocyanate reactive mixture further includes at least one polycarbonate polyol comprising hydroxyl terminal groups and recurring units each independently represented by the following formula (I):

$$-\!\!+\!\!O-R-O-\overset{\overset{\displaystyle O}{\|}}{C}\!\!+\!\!-$$

wherein R is $R_3$ is represented by the following formula (V):

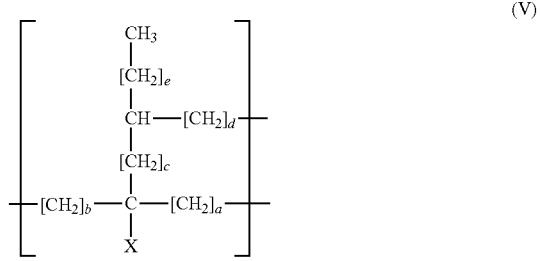

wherein a is from 0 to 5, b is from 4 to 12, c is from 1 to 6, d is from 0 to 5, e is from 3 to 7, and X is either H or an aliphatic $C_1$ to $C_{10}$ chain.

\* \* \* \* \*